(12) United States Patent
Kim et al.

(10) Patent No.: US 12,164,193 B2
(45) Date of Patent: *Dec. 10, 2024

(54) DISPLAY DEVICE

(71) Applicant: SAMSUNG ELECTRONICS CO., LTD., Suwon-si (KR)

(72) Inventors: Yong Wook Kim, Yongin-si (KR); Soo Kyung Kwon, Suwon-si (KR); Jaeyong Lee, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,606

(22) Filed: Oct. 10, 2023

(65) Prior Publication Data

US 2024/0036393 A1  Feb. 1, 2024

Related U.S. Application Data

(63) Continuation of application No. 17/726,033, filed on Apr. 21, 2022, now Pat. No. 11,809,040.

(30) Foreign Application Priority Data

Apr. 22, 2021 (KR) .......... 10-2021-0052476

(51) Int. Cl.
*G02F 1/13357* (2006.01)
*G02F 1/1335* (2006.01)

(52) U.S. Cl.
CPC .. *G02F 1/133603* (2013.01); *G02F 1/133514* (2013.01); *G02F 1/133617* (2013.01)

(58) Field of Classification Search
CPC .......... G02F 1/133614; G02F 2202/36; G02F 1/01791; G02F 1/133603; G02F 1/133617;
(Continued)

(56) References Cited

U.S. PATENT DOCUMENTS 10,551,553 B2   2/2020 Dubrow et al.
10,559,726 B2   2/2020 Kang et al.
(Continued)

FOREIGN PATENT DOCUMENTS

JP    2019091625 A    6/2019
KR    101585680 B1   11/2010
(Continued)

*Primary Examiner* — Omar Rojas Cadima
(74) *Attorney, Agent, or Firm* — CANTOR COLBURN LLP

(57) ABSTRACT

A display device includes a display panel, a backlight unit, and a light conversion sheet between the display panel and the backlight unit. The backlight unit includes a substrate and light-emitting sections arranged on the substrate, one or more light sources are disposed in each of the light-emitting sections, the light conversion sheet includes first partition walls and light conversion sections arranged to correspond to the light-emitting sections, a first partition wall of the first partition walls is disposed between adjacent light conversion sections of the light conversion sections. Each of the light conversion sections includes first quantum dots emitting a first light and second quantum dots emitting a second light having a color different from a color of the first light, and the at least one light source provides light of a predetermined wavelength to the light conversion sheet.

20 Claims, 13 Drawing Sheets

(58) Field of Classification Search
CPC ......... G02F 1/133602; G02F 1/133512; G02F 1/133514; G02F 2203/055; F21K 9/64; G02B 6/0026; G02B 5/201; G02B 6/0068; G02B 5/23; F21V 9/30; F21V 13/08; F21V 13/14; F21V 9/32; F21V 3/12; F21V 7/26; F21V 9/38; F21V 7/30; F21V 3/08; F21V 5/10; H10K 2102/331; B82Y 20/00; B82Y 30/00; B82Y 40/00; F21Y 2115/10; H01L 33/502; H01L 2933/0041; H01L 33/50
See application file for complete search history.

(56) References Cited

U.S. PATENT DOCUMENTS

| | | | |
|---|---|---|---|
| 10,585,226 | B2 | 3/2020 | Cho et al. |
| 10,802,334 | B2 | 10/2020 | Kim et al. |
| 2011/0006316 | A1 | 1/2011 | Ing et al. |
| 2015/0219936 | A1 | 8/2015 | Kim et al. |
| 2017/0250316 | A1* | 8/2017 | Yeon ..................... H01L 33/504 |
| 2018/0164488 | A1 | 6/2018 | Ohkawa et al. |
| 2020/0066803 | A1 | 2/2020 | Kim et al. |
| 2020/0264461 | A1 | 8/2020 | Kuwana et al. |
| 2020/0271993 | A1 | 8/2020 | Lim et al. |
| 2020/0371436 | A1 | 11/2020 | Kim et al. |
| 2020/0411784 | A1 | 12/2020 | Jang et al. |

FOREIGN PATENT DOCUMENTS

| | | | |
|---|---|---|---|
| KR | 1020170123283 A | | 11/2017 |
| KR | 1020170127185 A | | 11/2017 |
| KR | 1020190036611 A | | 4/2019 |
| KR | 1020190065570 A | | 6/2019 |
| KR | 1020200023964 A | | 3/2020 |
| KR | 1020200135188 A | | 12/2020 |
| WO | WO-2014107616 A1 * | 7/2014 | ....... G02F 1/133603 |

* cited by examiner

DISPLAY DEVICE

This application is a continuation of U.S. patent application Ser. No. 17/726,033, filed on Apr. 21, 2022, which claims priority to Korean Patent Application No. 10-2021-0052476, filed on Apr. 22, 2021, and all the benefits accruing therefrom under 35 U.S.C. § 119, the content of which in its entirety is herein incorporated by reference.

BACKGROUND

1. Field

Embodiments of the invention relate to a display device, and more particularly, to a display device capable of implementing improved display quality (e.g., increased contrast ratio, etc.) while including a light conversion sheet including a backlight unit and a luminescent nanostructure.

2. Description of the Related Art

In a display device having a display panel and a light source, an incident light supplied from the light source to the display panel may display a desired image on a screen. For this type of a display device, various researches have been actively conducted.

SUMMARY

Embodiments provide display devices capable of realizing improved image quality. Embodiments provide a photoconversion arrangement capable of improving an effect of a local dimming.

In an embodiment, a display device includes a display panel, a backlight unit, and a light conversion sheet between the display panel and the backlight unit, where the backlight unit includes a substrate and a plurality of light-emitting sections arranged on the substrate, and one or more light sources are disposed in each of the plurality of light-emitting sections, the light conversion sheet includes a plurality of first partition walls and a plurality of light conversion sections arranged to correspond to the plurality of light-emitting sections, where a first partition wall of the plurality of first partition walls is disposed between adjacent light conversion sections of the plurality of light conversion sections, each of the plurality of light conversion sections includes first quantum dots emitting a first light and second quantum dots emitting a second light having a color different from a color of the first light, and the at least one light source provides light of a predetermined wavelength (e.g., blue light) to the light conversion sheet (e.g., the first quantum dots and the second quantum dots).

In an embodiment, in the light conversion sheet, the light conversion sections may be defined by the first partition walls.

In an embodiment, each of the light conversion sections may down-convert a portion of the light of the predetermined wavelength into the first light and the second light to emit white light.

In an embodiment, the light of the predetermined wavelength may be light of a blue wavelength spectrum, the first light may include red light, and the second light may include green light.

In an embodiment, the white light may include a red wavelength spectrum component, a green wavelength spectrum component, and a blue wavelength spectrum component.

In an embodiment, the first quantum dots and the second quantum dots may be mixed in the light conversion section.

In an embodiment, the light conversion section may include a quantum dot (polymer) composite.

In an embodiment, the light conversion section (or the quantum dot composite) may further include a matrix (e.g., a polymer matrix), and the first quantum dots and the second quantum dots may be dispersed in the matrix.

In an embodiment, the substrate may include a circuit board for driving the light sources.

In an embodiment, the substrate may optionally include a second partition wall between at least two adjacent light-emitting sections among the plurality of light-emitting sections.

In an embodiment, the second partition wall may be disposed on the substrate so as to define the plurality of light-emitting sections (or so as to surround each of the plurality of light-emitting sections).

In an embodiment, when present, the second partition wall may be disposed to be overlapped with at least a portion of the first partition wall.

In an embodiment, the second partition wall may not exist between the plurality of light-emitting sections.

In an embodiment, the first partition wall may be disposed to be overlapped with at least a portion of the second partition wall (e.g., as determined in a vertical cross-section of the display device).

The first partition wall may be disposed so as not to be overlapped with the plurality of light-emitting sections (e.g., as determined in a vertical cross-section of the display device).

In an embodiment, each of the light conversion sections may have a length (e.g., the shortest length) of a straight line crossing a center of a given section of greater than or equal to about 100 micrometers (μm), greater than or equal to about 200 μm, greater than or equal to about 300 μm, greater than or equal to about 400 μm, greater than or equal to about 500 μm, greater than or equal to about 1,000 μm, or greater than or equal to about 2,000 μm.

In an embodiment, each of the light conversion sections may have a length (e.g., the shortest length) of a straight line crossing the center of a given section of less than or equal to about 20 cm, less than or equal to about 10 cm, less than or equal to about 5 cm, less than or equal to about 3 cm, less than or equal to about 1 cm, less than or equal to about 500 mm, less than or equal to about 100 mm, less than or equal to about 50 mm, less than or equal to about 10 mm, less than or equal to about 5 mm, or less than or equal to about 1 mm.

In an embodiment, an arrangement of the light conversion sections may form a grid, a honeycomb, or any combinations thereof.

In an embodiment, the light conversion sheet may have a thickness of greater than or equal to about 100 micrometers.

In an embodiment, the light conversion sheet may further include a protective layer (e.g., a polymer layer) on a surface or both surfaces of the sheet.

In an embodiment, the first partition wall may include a side wall extending in a thickness direction of the sheet within the light conversion sheet.

In an embodiment, the first partition wall may include a material that blocks at least a portion of the mixed light.

In an embodiment, the first partition wall may include a material that absorbs or reflects at least a portion of the mixed light.

In an embodiment, each section of the plurality of light-emitting sections may be independently driven (e.g., in response to a predetermined signal).

In an embodiment, the plurality of light-emitting sections may be matched to the light conversion section at one-to-one (1:1).

In an embodiment, the plurality of light-emitting sections may correspond to be matched with the light conversion section at n to 1 (e.g., one light-emitting section per n light conversion sections, where n is an integer of 2 or more and 50 or less).

In an embodiment, the second partition wall and the first partition wall may be disposed to correspond to the non-display area of the display device.

In an embodiment, the sub-pixels include a red pixel, a green pixel, and a blue pixel, and the display panel may further include a color filter layer including a red color filter, a green color filter, and a blue color filter corresponding to the red pixel, the green pixel, and the blue pixel, respectively.

In an embodiment, the display panel may further include a liquid crystal layer between the color filter layer and the light conversion sheet.

A display device in an embodiment may provide a screen with an improved quality, such as an increased contrast ratio and/or an improved black expression. In an embodiment, a display device or a backlight unit included therein may be utilized in a portable terminal device, a monitor, a note PC, a television, an electric sign board, a camera, a car, or the like.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
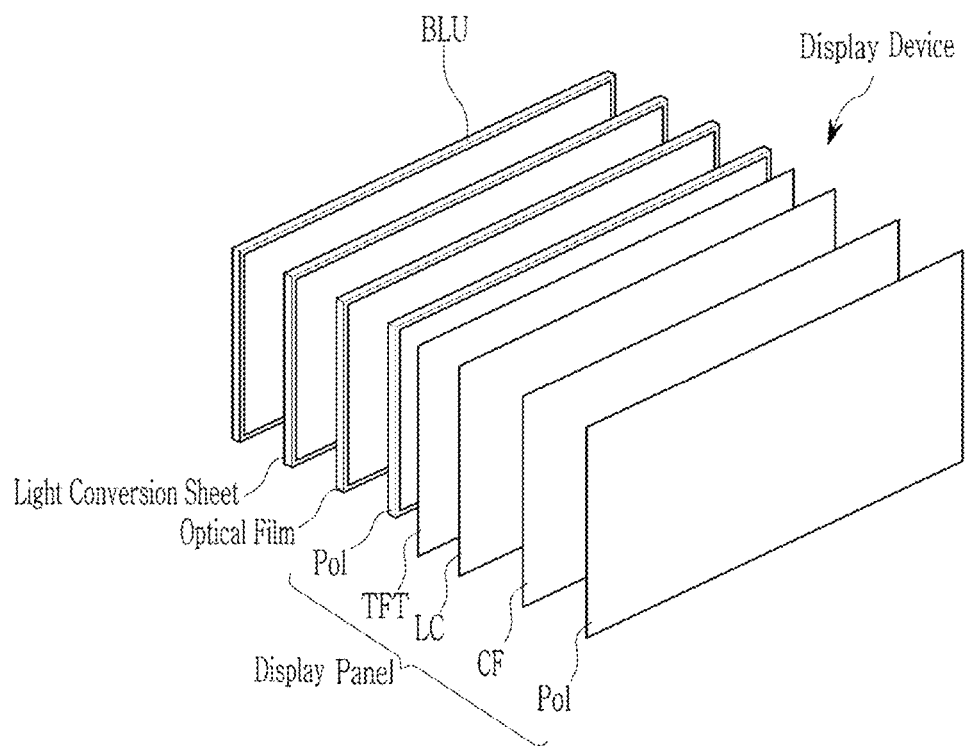
FIG. 1 is a schematic exploded view of an embodiment of a display device.

Hereinafter, various embodiments of the invention will be described in detail with reference to the accompanying drawings so that those of ordinary skill in the art may easily implement the embodiments of the invention. Embodiments of the invention may be implemented in various different forms and is not limited to the embodiments described herein.

The drawings and description are to be regarded as illustrative in nature and not restrictive. Like reference numerals designate like elements throughout the specification.

The size and thickness of each constituent element as shown in the drawings are randomly indicated for better understanding and ease of description, and this disclosure is not necessarily limited to as shown. In the drawings, the thickness of layers, films, panels, regions, etc., are exaggerated for clarity. In addition, in the drawings, for better understanding and ease of description, the thickness of some layers and areas is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means being disposed on or below the object portion, and does not necessarily mean being disposed on the upper side of the object portion based on a gravitational direction.

In addition, unless explicitly described to the contrary, the word "comprise," and variations such as "comprises" or "comprising," will be understood to imply the inclusion of stated elements but not the exclusion of any other elements.

In addition, in this specification, the phrase "in a plan view" means viewing a target portion from the top, and the phrase "in a cross-section" means viewing a cross-section formed by vertically cutting a target portion from the side.

Further, the singular includes the plural unless mentioned otherwise.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±10%, 5% of the stated value, for example.

Herein, the description that does not contain cadmium (or other toxic heavy metals or specific element) means that the concentration of cadmium (or the corresponding heavy metal or specific element) is less than or equal to about 100 parts per million (ppm) (by weight), less than or equal to about 50 ppm, less than or equal to about 10 ppm, less than or equal to about 1 ppm, less than or equal to about 0.1 ppm, less than or equal to about 0.01 ppm, or nearly about 0. In an embodiment, substantially no cadmium (or its heavy metal or specific element) is present, or, if present, cadmium is present in an amount or impurity level below the detection limit of a given detection means.

Herein, the quantum dot refers to a luminescent nanostructure, and the nanostructure refers to at least one region having a nanoscale dimension or a structure having a characteristic dimension. In an embodiment, the dimensions of the nanostructure may be less than about 300 nanometers (nm), less than about 250 nm, less than about 150 nm, less than about 100 nm, less than about 50 nm, or less than about 30 nm. These structures may have any shape. The nanostructures may have any shape, such as nanowires, nanorods, nanotubes, multi-pod type shapes having two or more pods, nanodots (or quantum dots), and are not particularly limited. In an embodiment, the nanostructures may be, for example, substantially crystalline, substantially monocrystalline, polycrystalline, amorphous, or any combinations thereof.

Quantum dots herein refer to (e.g., semiconductor-based) nanocrystals that exhibit quantum confinement or exciton confinement, and are a type of luminescent nanostructures (e.g., capable of emitting light by energy excitation). Herein, the shape of the "quantum dot" is not limited unless otherwise defined.

In a display device having a backlight unit, various technologies are being developed for improving display quality. In the display device, the backlight unit may include a light conversion sheet (e.g., a quantum dot sheet) including the luminescent nanostructure such as the quantum dot or the like, and light of desired wavelength components, which is emitted from the light conversion sheet, may be provided to a display panel, for example. In the backlight unit of the display device, a plurality of light sources (a combination of mini light-emitting elements, e.g., mini light-emitting diodes ("LEDs") or light-emitting sections having a size of several milli-meters to several tens of centi-meters) may be arranged to emit light of a predetermined wavelength toward a display area of the display panel, and this backlight unit may be operated in a local dimming manner. In the local dimming manner, a brightness of an area in the backlight unit may be controlled in a predetermined way, and thus a brightness of the backlight unit may be locally changed, for example, being adjusted according to a brightness of a screen image.

In the local dimming manner, the number of dimming areas and the number of the light sources corresponding thereto may be increased as desired, where presence of a plurality of the dimming areas may reinforce a local dimming effect. In the local dimming manner, a luminance of a predetermined section in a displaying region of a display device may be individually adjusted, whereby a contrast ratio of a corresponding pixel, that is, a ratio of a brightness of white (on) relative to a brightness in black (off) and/or a black expression of the display device may be increased or enhance.

However, the inventors have found that, in case of a backlight unit including a quantum dot sheet, an effect of the local dimming may be limited, and a desired improvement in a display quality may not be accomplished. Without wishing to be bound by any theory, in the light conversion sheet included in the backlight unit, a substantial light diffusion in a plane direction of the sheet may occur and thus as the light provided to have a controlled brightness according to a desired local dimming signal from the backlight unit passes through the quantum dot-based light conversion sheet, a boundary between adjacent dimming areas may become vague, and as a result of this, despite the adoption of the local dimming manner, substantially no improvement in the contrast ratio may be made.

In an embodiment, by having the feature(s) described herein, a display device including a backlight unit including a plurality of light-emitting sections (e.g., individual local dimming areas) and a light conversion sheet including a luminescent nanostructure (e.g., a quantum dot) may maximize a local dimming effect.

Figure 2A:
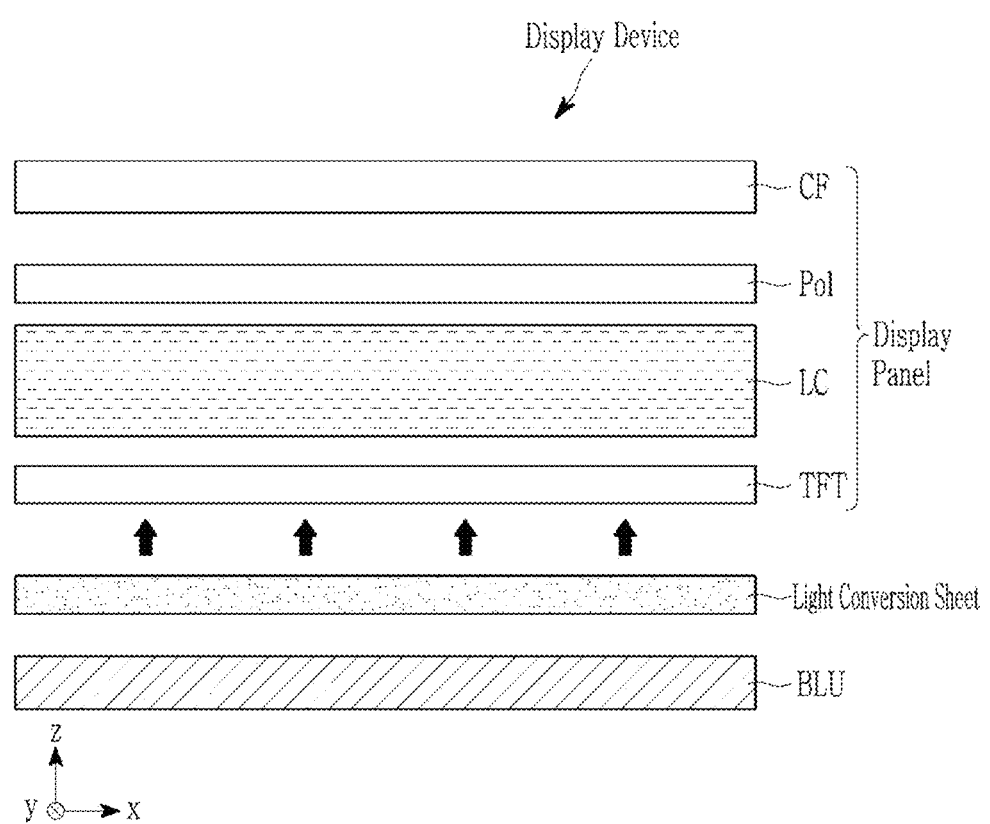
FIG. 2A is a schematic cross-sectional view of an embodiment of a display device.
Figure 2B:
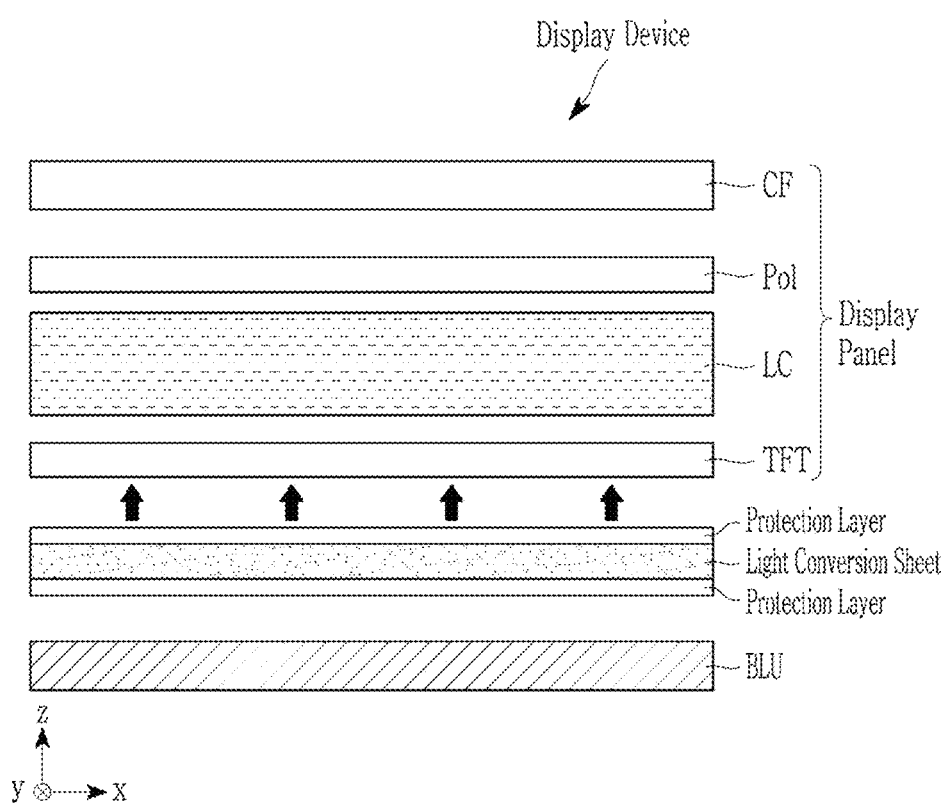
FIG. 2B is a schematic cross-sectional view of an embodiment of a display device.

Referring to FIGS. 1, 2A, and 2B, a display device of an embodiment includes a display panel, a backlight unit BLU, and a light conversion sheet between the display panel and the backlight unit BLU. The photoconversion arrangement of an embodiment includes the backlight unit BLU and a light conversion sheet disposed on the backlight unit BLU.

The display panel receives light emitted from the backlight unit BLU and the light conversion sheet to generate a predetermined image. Referring to FIGS. 1, 2A, and 2B, the display panel may have a structure in which a polarizing plate Pol, a liquid crystal layer LC, and a color filter CF are sequentially disposed. The display panel may further include an additional polarizing plate Pol between the liquid crystal layer and the color filter or on the color filter. A thin film transistor TFT may be disposed between the light conversion sheet (also referred to as a light conversion layer) and the liquid crystal layer.

The light emitted from the backlight unit BLU and the light conversion sheet may pass through the polarizing plate Pol, the liquid crystal layer LC, and optionally an additional polarizing plate Pol, and the transmitted light is incident on the color filter CF to generate an image of a predetermined color.

Figure 3A:
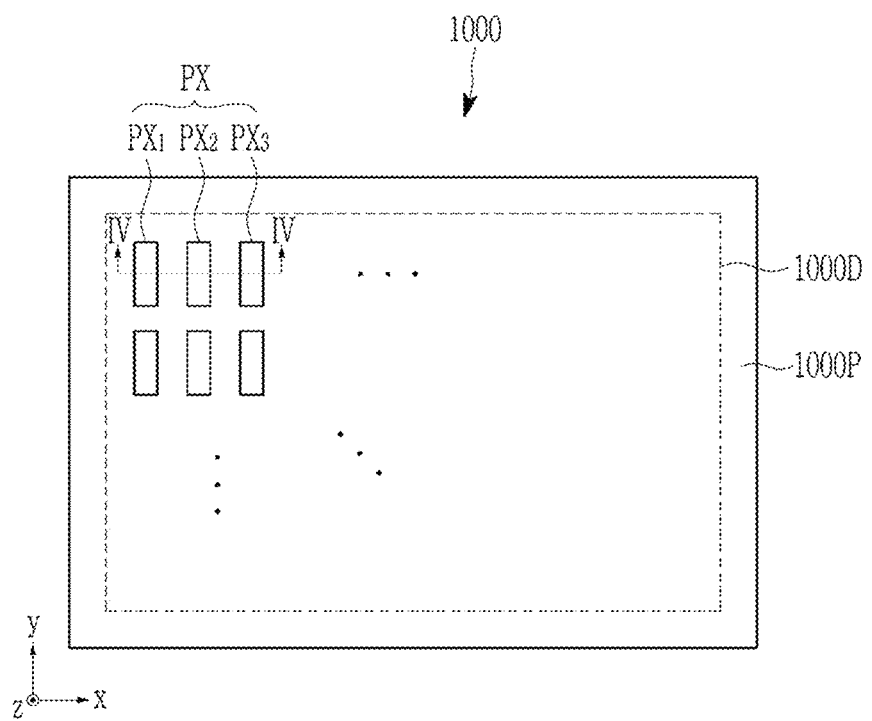
FIG. 3A is a plan view illustrating an embodiment of a pixel arrangement of a display panel in a display device.

Referring to FIG. 3A, the display panel 1000 in an embodiment includes a display area 1000D for displaying an image. The display area 1000D may include a plurality of pixels PX arranged along a row (e.g., x direction) and/or a column (e.g., y direction), and each pixel PX may include a plurality of sub-pixels $PX_1$, $PX_2$, and $PX_3$ displaying different colors from each other. Herein, In an embodiment, a configuration in which three sub-pixels $PX_1$, $PX_2$, and $PX_3$ constitute one pixel PX is illustrated, but the configuration is not limited thereto. An additional sub-pixel such as a white sub-pixel may be further included, and one or more sub-pixel displaying the same color may be included. The plurality of pixels PX may be arranged in, for example, a Bayer matrix, a PenTile™ matrix, and/or a diamond matrix, but is not limited thereto.

In an embodiment, each of the sub-pixels $PX_1$, $PX_2$, and $PX_3$ may display a color of three primary colors or a combination of three primary colors, for example, red, green, blue, or any combinations thereof. In an embodiment, the first sub-pixel $PX_1$ may display red, the second sub-pixel $PX_2$ may display green, and the third sub-pixel $PX_3$ may display blue, for example. In the display device of an embodiment, the sub-pixels may include a red pixel, a green pixel, and a blue pixel, and the display panel may further include a color filter layer including a red color filter, a green color filter, and a blue color filter respectively corresponding to the red pixel, the green pixel, and the blue pixel. The color filter may include an absorption type color filter. Such color filters are commercially available and are not particularly limited.

In the drawing, an embodiment in which all sub-pixels have the same size is illustrated, but the invention is not limited thereto. At least one of the sub-pixels may be larger or smaller than the other sub-pixels. In the drawing, an embodiment in which all sub-pixels have the same shape is illustrated, but the invention is not limited thereto. At least one of the sub-pixels may have a different shape from other sub-pixels.

The display panel may include a non-display area 1000P in a portion excluding the pixel portion. In an embodiment, the non-display area 1000P of the display panel may be disposed around the display area 1000D. In an embodiment, the non-display area 1000P of the display panel may be disposed between adjacent pixels PX and/or between adjacent sub-pixels ($PX_1$ and $PX_2$ and/or $PX_2$ and $PX_3$).

Figure 5A:
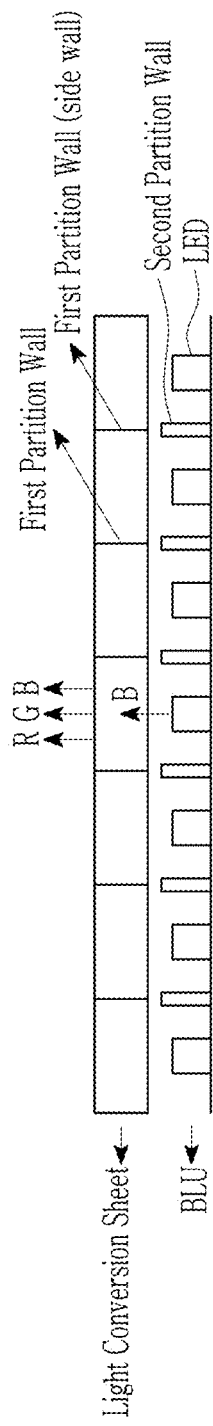
FIG. 5A is a schematic cross-sectional view of a light conversion sheet and a backlight unit (including a second partition wall) in a display device according to a non-limiting embodiment.
Figure 5B:
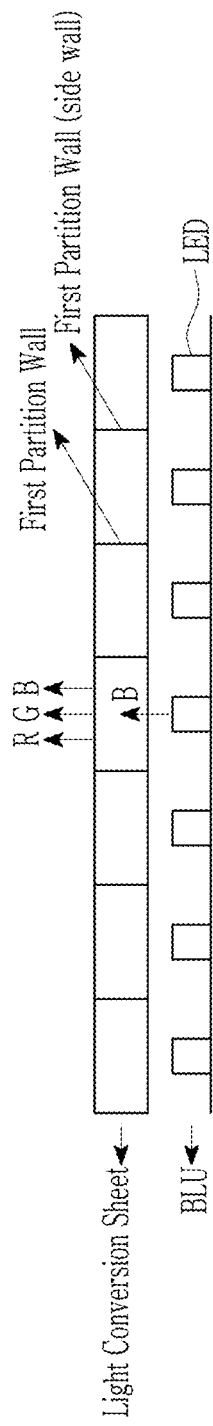
FIG. 5B is a schematic cross-sectional view of a light conversion sheet and a backlight unit in a display device according to a non-limiting embodiment.

In an embodiment, the display panel may further include a liquid crystal layer 220 between the color filter layer and the light conversion sheet. Referring to FIG. 5B, the display panel may include a lower substrate 210, a color filter layer CF, and a liquid crystal layer 220 between the color filter and the lower substrate 210. The display panel may further include an upper substrate 240, and the color filter layer CF may be provided on one surface (e.g., upper or lower surface) of the upper substrate 240.

The lower substrate 210 may be an array substrate. The lower substrate 210 may be a substrate including an insulating material (e.g., an insulating transparent substrate). In an embodiment, the substrate may include glass; various polymers such as polyester (e.g., polyethyleneterephthalate ("PET"), polyethylenenaphthalate ("PEN")), polycarbonate, poly(meth)acrylate, polyimide, polyamideimide, etc.; polysiloxane (e.g. polydimethylsiloxane ("PDMS")); glass, an inorganic material such as silicon, silicon oxide, or $Al_2O_3$, or any combinations thereof, but is not limited thereto. Herein, "transparent" refers to light transmittance of greater than or equal to about 85%, for example, greater than or equal to about 88%, greater than or equal to about 90%, greater than or equal to about 95%, greater than or equal to about 97%, or greater than or equal to about 99% for light in a predetermined wavelength (e.g., light emitted from a light conversion sheet or light passing a color filter). The thickness of the substrate may be appropriately selected in consideration of the substrate material or the like, and is not particularly limited. The substrate may have flexibility.

A wire plate 211 is provided on an upper surface of the lower substrate 210. The wire plate 211 may include a plurality of gate wires (not shown) and data wires (not shown) that define a display area (e.g., a pixel area), a thin film transistor disposed adjacent to a crossing region of gate wires and data wires, and a pixel electrode for each pixel area, but is not limited thereto.

In an embodiment, the display panel may include a liquid crystal layer 220 on the wire plate 211. An alignment layer 221 may be disposed on and under the layer 220 to initially align the liquid crystal material included therein. Specific details of the liquid crystal material and the alignment layer 221 (e.g., a liquid crystal material, an alignment layer material, a method of forming liquid crystal layer, a thickness of the liquid crystal layer, etc.) may be appropriately selected and are not particularly limited. In an embodiment, the display panel may include a polarizing plate Pol under the lower substrate 210, between the liquid crystal layer and the upper substrate 240, on the upper substrate 240, or any combinations thereof. Materials and structures of the upper and lower polarizing plates Pol may be appropriately selected, and are not particularly limited. The polarizing plate Pol may be any polarizer that may be used in a display device. The polarizing plate Pol may be triacetyl cellulose ("TAC") having a thickness of less than or equal to about 200 micrometers (μm), but is not limited thereto. In another embodiment, an optical device having a refractive index control coating without a polarization function may be used with or instead of the upper polarizing plate Pol.

A black matrix BM may be provided on one surface of the upper substrate 240, in which an opening is defined and which covers gate lines, data lines, and thin film transistors of a wire plate 211 provided on the lower substrate 210. The black matrix BM may correspond to a non-display area of the display device. In an embodiment, the black matrix BM may have a grid shape. In each opening of the black matrix BM, a first color filter R for a first light (e.g., red light), a second color filter G for a second light (e.g., green light), and a third light such as a third color filter B for blue light may be disposed to form a color filter layer CF.

In the color filter layer CF, each color filter may be repeated corresponding to a pixel area (e.g., a display area) formed on the lower substrate 210. The black matrix BM and first partition wall/second partition wall, which will be described later, may be repeated corresponding to the non-display area of the display panel. In an embodiment, when viewed from a cross-section of the display device, the black matrix BM may be disposed to at least partially be overlapped with first partition wall and/or second partition wall to be described later.

Figure 3B:
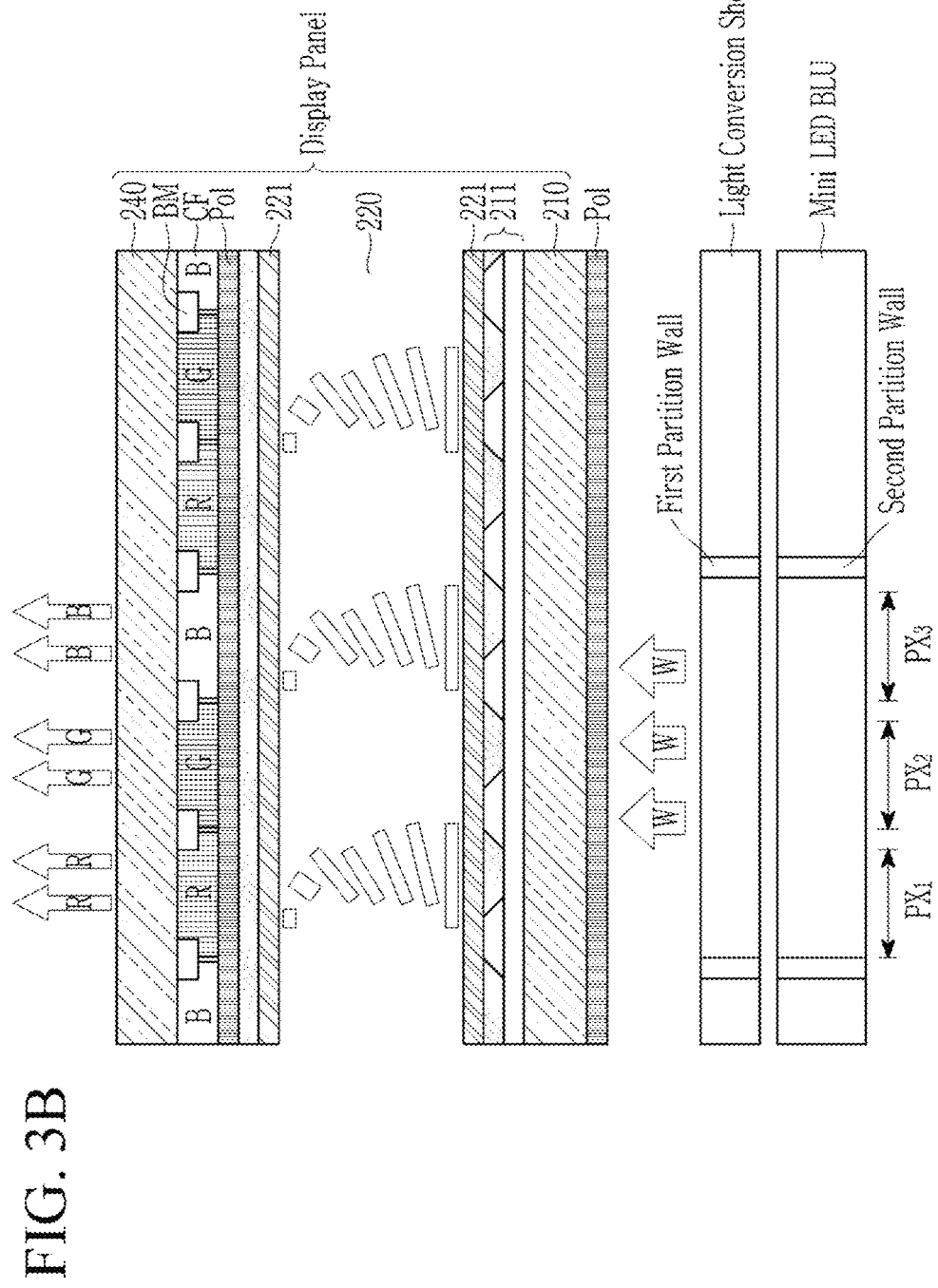
FIG. 3B schematically illustrates a vertical cross-sectional view taken along line IV-IV in the display device of FIG. 3A.

In the display device of an embodiment, a backlight unit BLU and a light conversion sheet may be provided under the display panel (e.g., under the polarizing plate Pol). Referring to FIGS. 2A, 2B, and 3B, the light conversion sheet and the backlight unit BLU are sequentially disposed under the display panel.

The backlight unit BLU may include a substrate and a plurality of light-emitting sections arranged on the substrate, and in each of the light-emitting sections, at least one light source may be disposed. Each section of the plurality of light-emitting sections may be independently driven (e.g., in response to a predetermined signal such as a local dimming signal).

The substrate may include a circuit board for light sources included in the light-emitting section. In an embodiment, light sources may be disposed on one surface of a substrate (e.g., a circuit board) to form light-emitting sections. The light sources may include devices emitting light (e.g., blue light) of a predetermined wavelength such as LEDs. A size of the LED may be appropriately selected in consideration of the size of the display device and the size of the local dimming area (i.e., the light-emitting sections), and is not particularly limited. A dimensions (e.g., a width or a height) of the light source or LED may be greater than or equal to about 100 μm, greater than or equal to about 110 μm, greater than or equal to about 200 μm, greater than or equal to about 250 μm, greater than or equal to about 300 μm, greater than or equal to about 350 μm, greater than or equal to about 400 μm, greater than or equal to about 450 μm, greater than or equal to about 500 μm, greater than or equal to about 550 μm, greater than or equal to about 600 μm, greater than or equal to about 650 μm, or greater than or equal to about 700 μm. The dimensions of the LED may be less than or equal to about 5000 μm, less than or equal to about 3000 μm, less than or equal to about 1000 μm, less than or equal to about 500 μm, less than or equal to about 400 μm, less than or equal to about 300 μm, less than or equal to about 200 μm, or less than or equal to about 150 μm.

The substrate may further include a reflective film. The circuit board may include a backlight driving circuit. The backlight driving circuit may control, for example, the light sources (e.g., light-emitting elements) so that the luminance of light provided to the display panel (e.g., toward the lower substrate 210 thereof) in response to a local dimming signal applied from the outside may be controlled for each light-emitting section. The backlight driving circuit may be used by appropriately selecting a circuit used in the display panel for the local dimming method.

The light source included in the light-emitting section may be a light-emitting element or an LED (or LED package) that emits light (e.g., blue light) of a predetermined wavelength. The predetermined wavelength or the wavelength of the blue light emitted from the light source may be in the range of greater than or equal to about 450 nm, greater than or equal to about 455 nm, or greater than or equal to about 460 nm and/or less than or equal to about 480 nm, for example, less than or equal to about 475 nm, less than or equal to about 470 nm, or less than or equal to about 465 nm.

In the BLU, each of the light-emitting sections may be optically separated, and accordingly, it is possible to prevent the light emitted from each of the light sources from being output beyond the local dimming area during the local dimming driving. In an embodiment, the substrate of the BLU may optionally include a second partition wall between at least two adjacent light-emitting sections among the plurality of light-emitting sections (refer to FIG. 3B).

The second partition wall may be disposed on the substrate so as to define the light-emitting section (or to surround each of the light-emitting sections). When present, the second partition wall may be disposed to be overlapped with at least a portion of the first partition wall in the light conversion sheet, as will be described later (refer to FIGS. 3B and 5A).

The second partition wall may have any cross-sectional shape such as a triangle or a quadrangle. Although illustrated as having a quadrangular (e.g., rectangular) cross-section in the drawings, the invention is not limited thereto, and may have any shape such as a polyhedron, an ellipse, or the like. The second partition wall may have a dimension desired to optically separate the respective light-emitting sections. In an embodiment, the height of the second partition wall may be equal to or greater than the height of the light source. In an embodiment, the width of the partition wall may be appropriately selected in consideration of the width of the non-display area, the width of the first partition wall, the width of the local dimming area, arrangement of light sources, or the like, which will be described later.

In an embodiment, the second partition wall may not exist between the plurality of light-emitting sections (refer to FIG. 5B). In an embodiment, each of the light sources may include a light collecting member (not shown) such as a lens disposed thereon to prevent unwanted light transmission into adjacent light-emitting sections. Referring to FIGS. 5A and 5B, for example, blue light (B) emitted from the BLU is supplied to the light conversion sheet, and each section of the light conversion sheet emits mixed light or white light.

Figure 4A:
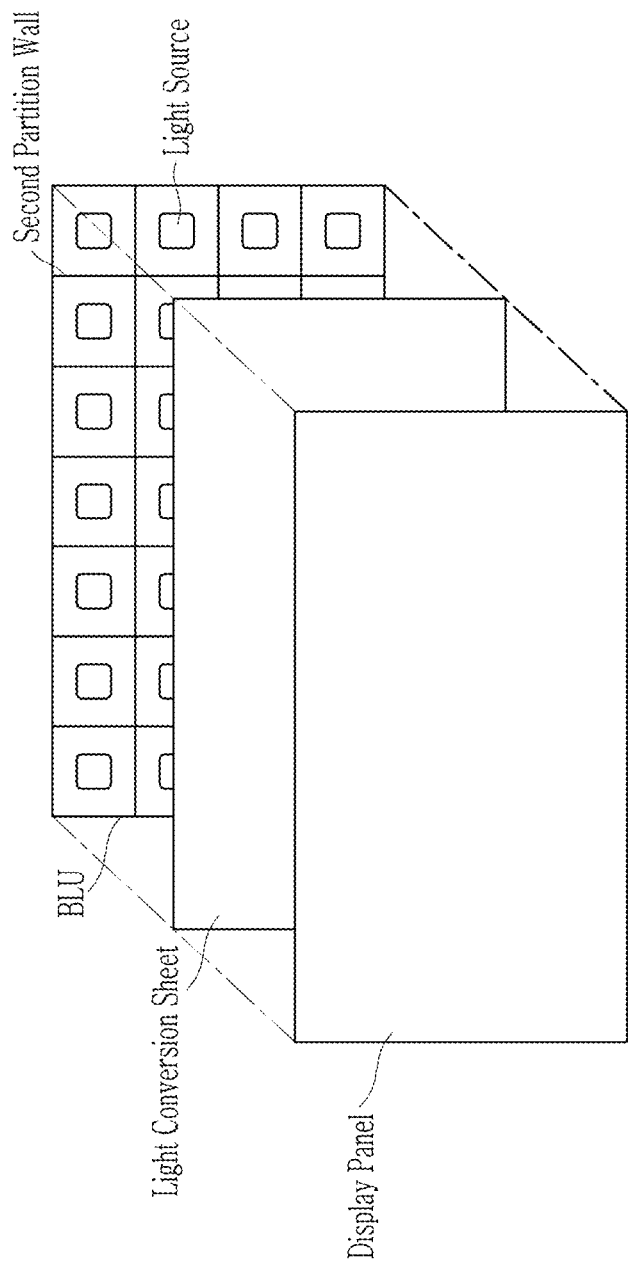
FIG. 4A is a schematic exploded view of an embodiment of a display device.
Figure 4B:
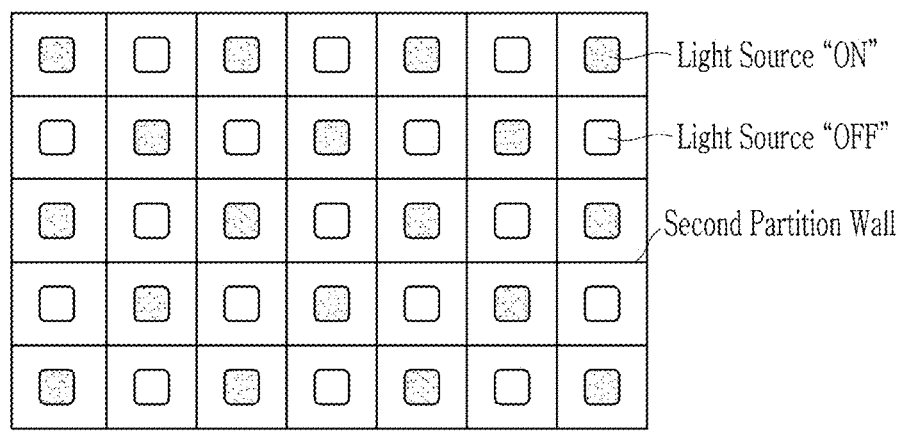
FIG. 4B is a schematic top view of an embodiment of a backlight unit (including light-emitting sections arranged in a grid arrangement) that may be included in a display device.

In an embodiment, the arrangement of the light-emitting sections may be designed as desired, and is not particularly limited. In one non-limiting embodiment, the partition walls may have a checkerboard or grid shape as in FIGS. 4A and 4B. In another embodiment, the partition walls may be formed to have a honeycomb shape as shown in FIG. 4B.

Figure 4C:
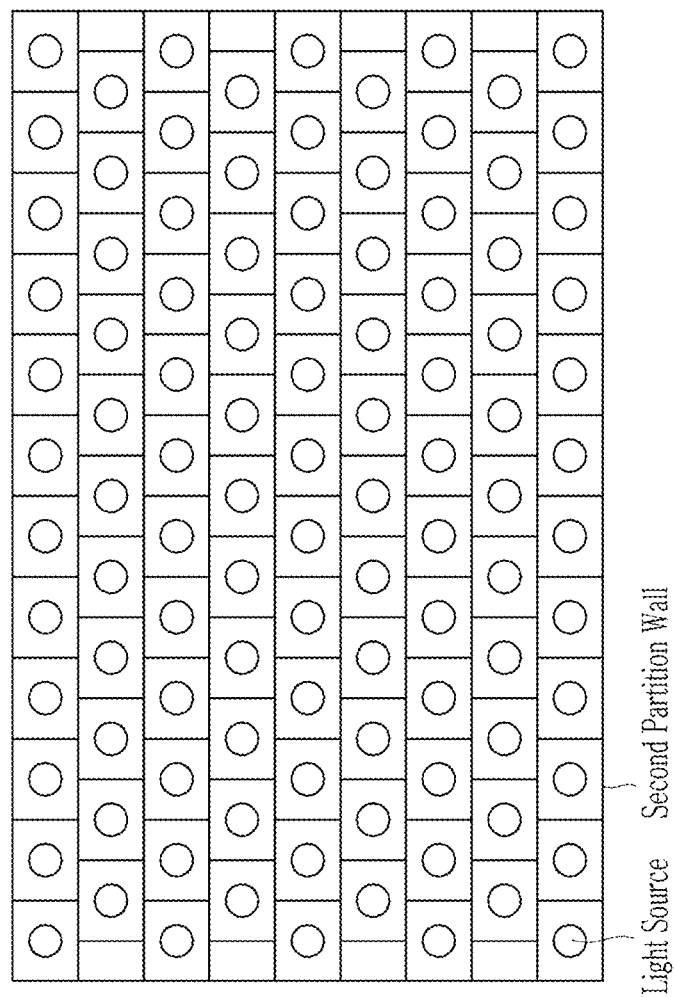
FIG. 4C is a schematic top view of an embodiment of a backlight unit (including light-emitting sections in a honeycomb arrangement) that may be included in a display device.
Figure 4D:
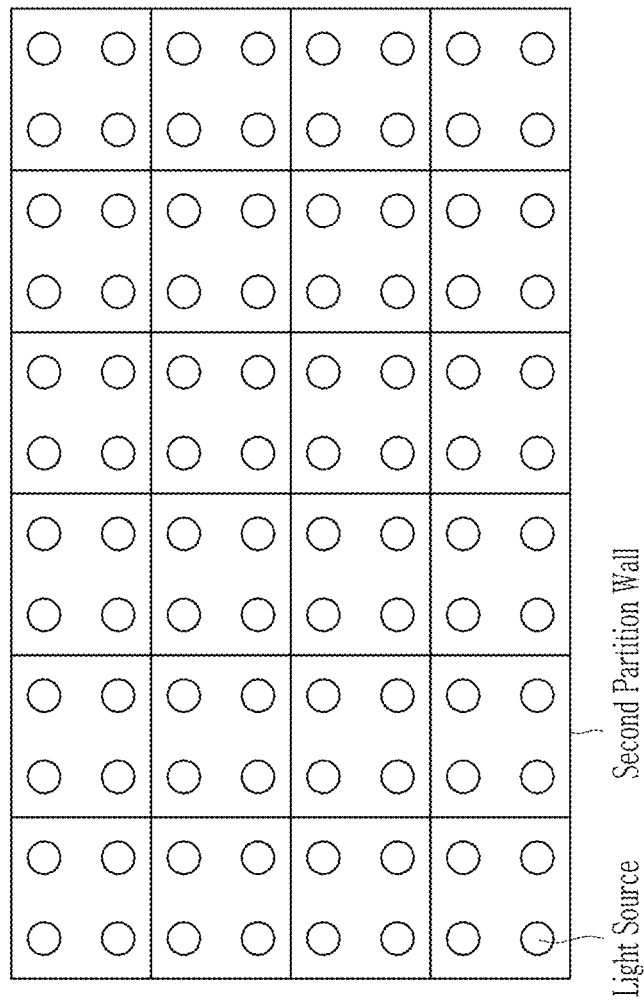
FIG. 4D is a schematic plan view of an embodiment of a backlight unit (having a light-emitting section including a plurality of light sources) that may be included in a display device.

In an embodiment of the BLU, one light source may be disposed in one light-emitting section, or a plurality of LEDs that may be simultaneously controlled may be disposed as shown in FIG. 4C. In an embodiment, a light collecting member such as a partition wall or a lens may condense light from the LEDs in blocks to enhance a local dimming effect, and may work together with the first partition wall to achieve an increased contrast ratio.

The dimension (e.g., length of one side) of the light-emitting section may be greater than or equal to about 100 micrometer (μm), for example, greater than or equal to about 110 μm, greater than or equal to about 200 μm, greater than or equal to about 250 μm, greater than or equal to about 300 μm, greater than or equal to about 350 μm, greater than or equal to about 400 μm, greater than or equal to about 450 μm, greater than or equal to about 500 μm, greater than or equal to about 550 μm, greater than or equal to about 600 μm, greater than or equal to about 650 μm, or greater than or equal to about 700 μm. The dimension (e.g., length of one side) of the light-emitting section may be less than or equal to about 2000 μm, less than or equal to about 1500 μm, less than or equal to about 1000 μm, less than or equal to about 500 μm, less than or equal to about 400 μm, less than or equal to about 300 μm, less than or equal to about 200 μm, or less than or equal to about 150 μm. The number of light-emitting sections in the backlight unit BLU may be appropriately determined in consideration of the number of local dimming areas, the area of the display area, or the like. In an embodiment, the number of light-emitting sections may be 10 or more, 50 or more, 100 or more, 500 or more, 1000 or more, 5000 or more, or 10,000 or more. In an embodiment, the number of light-emitting sections may be 50,000 or less, 30,000 or less, 10,000 or less, or 5000 or less.

The light conversion sheet is disposed on the backlight unit BLU. In other words, the display device in an embodiment includes a light conversion sheet disposed between the display panel and the backlight unit BLU.

As confirmed by the inventors, as described above, when the backlight including a plurality of light-emitting sections is combined with the light conversion sheet, a local dimming technique is not easy to implement. In the display device in an embodiment, light diffusion of the light conversion sheet in a plane direction is efficiently blocked, increasing a contrast ratio when the local dimming technique is implemented. Accordingly, the light conversion sheet of an embodiment includes (a plurality of) the first partition walls and the light conversion sections disposed between the first partition walls. The light conversion sections may be defined by the first partition walls and arranged to correspond to the light-emitting sections. Each light conversion section includes first quantum dots emitting first light and second quantum dots emitting second light of a different color from the first light.

Without being bound by any particular theory, the aforementioned first partition walls may play a role of suppressing light diffusion in the light conversion sheet, and accordingly, one section cannot but be affected by the light emission of its neighboring section. Accordingly, the light conversion sheet may extract light (e.g., white light) matching dimming signals provided to the backlight unit BLU and realize dimming of the white light that matches each area dimming of the backlight unit BLU.

The light conversion sheet may be provided with light of a predetermined wavelength, which is provided from a plurality of the light sources of the backlight, and the light conversion sections thereof respectively down-convert a portion of the light of the predetermined wavelength into the first light and the second light (e.g., respectively by the first quantum dots and the second quantum dots) and thus emit light having desired components. The emitted light is provided to the display panel.

In the light conversion sheet, the first light may have a different color (e.g., a different center wavelength) from the second light. In an embodiment, the first light may be light of a red wavelength spectrum (hereinafter, red light, R), and the second light may be light of a green wavelength spectrum (green light, G). In an embodiment, the first light may be green light, and the second light may be red light. The light of a predetermined wavelength may be light of a blue wavelength spectrum (blue light, B). In the light conversion sheet, each of the light conversion sections may emit mixed light (R, G, and B) or white light. The white light may include a red wavelength spectrum component, a green wavelength spectrum component, and a blue wavelength spectrum component.

The maximum emission peak wavelength of the red light may be in the range of greater than or equal to about 600 nm and less than or equal to about 680 nm. The red light may have a maximum emission peak wavelength in a wavelength region of greater than or equal to about 600 nm and less than or equal to about 580 nm, about 610 nm to about 670 nm, about 615 nm to about 665 nm, about 620 nm to about 660 nm, about 625 nm to about 650 nm, about 630 nm to about 645 nm, or about 635 nm to about 640 nm.

The maximum emission peak wavelength of the green light may be in the range of greater than or equal to about 500 nm and less than or equal to about 580 nm. The green light may have a maximum emission peak wavelength in a wavelength region of greater than or equal to about 500 nm and less than or equal to about 580 nm, about 510 nm to about 570 nm, about 515 nm to about 565 nm, about 520 nm to about 560 nm, about 525 nm to about 550 nm, about 530 nm to about 545 nm, or about 535 nm to about 540 nm.

The quantum dots may have a core-shell structure having a (semiconductor nanocrystal) core and a (semiconductor nanocrystal) shell disposed on the core. In an embodiment, the quantum dot, the semiconductor nanocrystal core, and/or the semiconductor nanocrystal shell may include a Group II-VI compound, a Group III-V compound, a Group IV-VI compound, a Group IV element or compound, a Group I-II-IV-VI compound, or any combinations thereof. In an embodiment, the quantum dots may not include cadmium, lead, mercury, or any combinations thereof.

In an embodiment, the Group II-VI compound may be selected from a binary element compound selected from CdSe, CdTe, ZnS, ZnSe, ZnTe, ZnO, HgS, HgSe, HgTe, MgSe, MgS, and a combination thereof; a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof. The Group III-V compound may be selected from a binary element compound selected from GaN, GaP, GaAs, GaSb, AlN, AlP, AlAs, AlSb, InN, InP, InAs, InSb, and a combination thereof; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and a quaternary element compound selected from GaInNSb, GaInPAs, GalnPSb, InAlNP, InAlNAs, InAlNSb, InAlPAs, InAlPSb, and a combination thereof. The Group IV-VI compound may be selected from a binary element compound selected from SnS, SnSe, SnTe, PbS, PbSe, PbTe, and a combination thereof; a ternary element compound selected from SnSeS, SnSeTe, SnSTe, PbSeS, PbSeTe, PbSTe, SnPbS, SnPbSe, SnPbTe, and a combination thereof; and a quaternary element compound selected from SnPbSSe, SnPbSeTe, SnPbSTe, and a combination thereof. In an embodiment, the Group compound may include $CuInSe_2$, $CuInS_2$, CuInGaSe, and CuInGaS, but are not limited thereto. In an embodiment, the Group I-II-IV-VI compound may include CuZnSnSe, and CuZnSnS, but are not limited thereto. The Group IV element or compound may be selected from a single substance selected from Si, Ge, and a combination thereof; and a binary element compound selected from SiC, SiGe, and a combination thereof. The Group III-V compound may further include a Group II metal (e.g., InZnP, etc.).

The binary element compound, the ternary element compound or the quaternary element compound respectively exist in a uniform concentration in the particle or partially different concentrations in the same particle. In an embodiment, when the quantum dot has a core-shell structure, the semiconductor nanocrystal of the shell may have a larger energy bandgap than the semiconductor nanocrystal of the core. In another embodiment, when the quantum dot has a core-shell structure, the semiconductor nanocrystal of the shell may have a smaller energy bandgap than the semiconductor nanocrystal of the core. In the case of configuring a multi-layered shell, the shell outside the core may have a larger energy bandgap than the shell close to the core, but is not limited thereto. In a core-shell quantum dot including a multi-layered shell, a shell outside the quantum dot may have a smaller energy bandgap than a shell close to the core.

The quantum dots may have a particle diameter (the size of the longest portion when not spherical) of about 1 nm to about 100 nm. In an embodiment, the quantum dots may have a particle diameter (the size of the longest portion when not spherical) of about 1 nm to about 20 nm, for example, about 2 nm (or about 3 nm) to about 15 nm. In an embodiment, the quantum dots may have a size of less than or equal to about 10 nm, for example, less than or equal to about 9 nm, less than or equal to about 8 nm, or less than or equal to about 7 nm.

In an embodiment, the quantum dots refer to semiconductor nanocrystal particles capable of exhibiting a quantum confinement effect, and their shapes are not particularly limited. In an embodiment, the quantum dots may include spherical, pyramidal, multi-arm, or cubic nanoparticles, nanotubes, nanowires, nanofibers, nanosheets, or combinations thereof. The quantum dot may be commercially available or may be synthesized according to any method. In an embodiment, several nano-sized quantum dots may be synthesized according to a wet chemical process, for example. In the wet chemical process, precursors react in an organic solvent to grow nanocrystal particles, and the organic solvent or a ligand compound may coordinate the surface of the semiconductor nanocrystal, controlling the growth of the nanocrystal. Materials of the organic solvent and ligand compound are not particularly limited. The organic solvent coordinated on the surface of the quantum dot may affect stability of a device, and thus excess organic materials that are not coordinated on the surface of the quantum dot may be removed by pouring it in excessive non-solvent, and centrifuging the resulting combination. In an embodiment, the non-solvent may include acetone, ethanol, methanol, or the like, but are not limited thereto.

The quantum dots may have an organic ligand bound to the surface. The organic ligand may have a hydrophobic moiety. In an embodiment, the organic ligand having the hydrophobic moiety may include RCOOH, $RNH_2$, $R_2NH$, $R_3N$, RSH, $R_3PO$, $R_3P$, ROH, RCOOR', $RPO(OH)_2$, $R_2POOH$, where, R and R' are each independently a substituted or unsubstituted C1 to C40 (or C5 to C24) aliphatic hydrocarbon group, for example, a substituted or unsubstituted alkyl, a substituted or unsubstituted alkenyl, or C3 to C40 (or C5 to C20) aromatic hydrocarbon group, for example, an aryl group), or any combinations thereof.

In an embodiment, the organic ligand compound may include a thiol compound such as methane thiol, ethane thiol, propane thiol, butane thiol, pentane thiol, hexane thiol, octane thiol, dodecane thiol, hexadecane thiol, octadecane thiol, benzyl thiol, or the like; amines such as methane amine, ethane amine, propane amine, butane amine, pentyl amine, hexyl amine, octyl amine, nonylamine, decylamine, dodecyl amine, hexadecyl amine, octadecyl amine, dimethyl amine, diethyl amine, dipropyl amine, tributylamine, trioctylamine, or the like; carboxylic acid compounds such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, or the like; phosphine compounds such as methyl phosphine, ethyl phosphine, propyl phosphine, butyl phosphine, pentyl phosphine, octylphosphine, dioctyl phosphine, tributylphosphine, trioctylphosphine, or the like; phosphine compounds or oxide compounds thereof such as methyl phosphine oxide, ethyl phosphine oxide, propyl phosphine oxide, butyl phosphine oxide pentyl phosphineoxide, tributylphosphineoxide, octylphosphine oxide, dioctyl phosphineoxide, or trioctylphosphineoxide, diphenyl phosphine, triphenyl phosphine compound or an oxide combination thereof; C5 to C20 alkyl C5 to C20 alkyl phosphonic acid such as hexylphosphinic acid, octylphosphinic acid, dodecanephosphinic acid, tetradecanephosphinic acid, hexadecanephosphinic acid, octadecanephosphinic acid, but are not limited thereto. The quantum dot may include the organic ligand alone or as a combination of one or more.

The quantum dots may have quantum efficiency of greater than or equal to about 10%, for example, greater than or equal to about 30%, greater than or equal to about 50%, greater than or equal to about 60%, greater than or equal to about 70%, greater than or equal to about 90%, or even about 100%. In addition, quantum dots may have a narrow photoluminescence spectrum. In an embodiment, the quantum dots may have a full width at half maximum ("FWHM") of the emission wavelength spectrum of less than or equal to about 45 nm, e.g., less than or equal to about 40 nm, or less than or equal to about 30 nm. The quantum dots may vary in size and composition to emit light in the wavelength range from ultraviolet to visible or even near infrared or higher. The quantum dots may emit light in the range of about 300 nm to about 700 nm or at a wavelength of greater than or equal to about 700 nm, but are not limited thereto. The quantum dots may emit green light or red light. Details of the green light and the red light are the same as described above.

The first quantum dots and the second quantum dots may be mixed in the light conversion section. In an embodiment, the light conversion sheets may include a quantum dot polymer composite disposed within each light conversion section. The quantum dot polymer composite may have a film shape. The light conversion section (or quantum dot polymer composite film disposed within the section) may include a matrix (e.g., a polymer matrix); and the first quantum dots and the second quantum dots randomly dispersed in the matrix.

The polymer may include a polymerization product of polymerizable components. In an embodiment, the polymerizable components may include a monomer having a carbon-carbon unsaturated bond (e.g., a double bond, a triple bond, or any combinations thereof), a compound having at least one or two or more thiol (—SH) groups (monothiol, polythiol, or the like), or any combinations thereof. The polymerizable components may include a combination of a first monomer having at least two SH groups at the terminal end and a second monomer having at least two carbon-carbon unsaturated bonds at the terminal end, or a (meth) acrylate-based monomer or oligomer, a urethane acrylate-based monomer or oligomer, an epoxy-based monomer or oligomer, and a silicone-based monomer or oligomer, but is not limited thereto. In an embodiment, the (meth)acrylate-based monomer may be selected from isobornyl (meth)acrylate, isooctyl (meth)acrylate, lauryl (meth)acrylate, benzyl (meth)acrylate, norbornyl (meth)acrylate, cyclohexyl (meth)acrylate, n-hexyl (meth)acrylate, iso-octyl (meth)acrylate, butyl (meth)acrylate, adamantyl acrylate, cyclopentyl acrylate, ethylene glycol dimethacrylate, hexanediol diacrylate, tricyclodecane dimethanol diacrylate, trimethylol propanetriacrylate, and any combinations thereof.

The polymerizable oligomer is an oligomer having one or more, for example, two or more polymerizable functional groups (e.g., (meth)acrylate group, vinyl group, etc.). The polymerizable oligomer may be selected from urethane (meth)acrylate, epoxy (meth)acrylate, polyester (meth)acrylate, acrylic (meth)acrylate, polybutadiene (meth)acrylate, silicone (meth)acrylate, melamine (meth)acrylate, and any combinations thereof. The molecular weight of the polymerizable oligomer is not particularly limited and may be appropriately selected. In an embodiment, the molecular weight of the polymerizable oligomer may be about 1,000 grams per mole (g/mol) to about 20,000 g/mol, for example, about 1,000 g/mol to about 10,000 g/mol, for example, but is not limited thereto. Such polymerizable oligomers may be synthesized by various methods or are commercially available.

The light conversion sheet may be provided with a protective layer on one or both surfaces thereof. In an embodiment, the protective layer may include a polymer film (e.g., for preventing deterioration of quantum dots, etc.), an inorganic oxide (e.g., silica, etc.), or any combinations thereof.

The polymer film may include a polymer selected from a polyester, such as polyethylene terephthalate, polybutylene terephthalate, and polyethylene naphthalate, a cyclic olefin polymer ("COP"), a polymerized polymer (e.g., thiolene polymer) of a first monomer having at least two thiol (—SH) groups at the terminal end and a second monomer having at least two carbon-carbon unsaturated bonds at the terminal end, and any combinations thereof. The cyclic olefin polymer refers to a polymer obtained by polymerizing a chain olefin compound such as ethene and a cyclic olefin monomer such as norbornene or tetracyclododecene.

The inorganic oxide may be selected from silica, alumina, titania, zirconia, and any combinations thereof. These inorganic oxides may act as light diffusing materials. The inorganic oxide may be provided by being coated on the surface of the protective layer to a thickness of about 10 nm to about 100 nm.

The polymer film may have irregularities of a predetermined size on a surface that does not contact the quantum dot composite film. The polymer film having irregularities on the surface may serve to diffuse the light incident on the light conversion sheet or light emitted from the light conversion sheet. In the display device in the embodiment, a diffusion plate or a prism sheet may be present or absent between the backlight unit BLU and the light conversion sheet.

On the light conversion sheet or between the light conversion sheet and the liquid crystal panel, at least one optical film selected from a diffusion plate, a prism sheet, a microlens sheet, and a brightness enhancement film (e.g., a double brightness enhance film ("DBEF")) may be further provided as needed (refer to FIG. 1). In addition, the light conversion sheet may be disposed between at least two films selected from a diffusion plate, a prism sheet, a microlens sheet, and a brightness enhancing film (e.g., a DBEF). The optical film includes those commercially available in the field of display devices (e.g., liquid crystal display devices), and the type thereof is not particularly limited.

In the light conversion sheet, the first partition wall may not be disposed on the plurality of light-emitting sections of the backlight unit BLU. The first partition wall may include a side wall extending in a thickness direction of the sheet within the light conversion sheet (refer to FIGS. 3B, 5A, and 5B). The second partition wall and the first partition wall may be disposed to correspond to the non-display area of the display device.

The first partition wall may include a material that blocks at least a portion of the mixed light. The first partition wall may include a material that absorbs or reflects at least a portion of the mixed light. The first partition wall may include a light-blocking member. In an embodiment, the first partition wall may include a pigment (which may block, for example, absorb, or reflect light). In an embodiment, the pigment may include a white pigment, a black pigment, or any combinations thereof. In an embodiment, the first partition wall may be produced from a photoresist composition including a pigment (e.g., a composition for a black matrix). A photoresist composition including a pigment may be commercially available or various compositions may be used.

Each of the light conversion sections may have a straight line length (e.g., the shortest length, hereinafter also referred to as a light conversion section dimension) of a straight line that crosses the center of the section of greater than or equal to about 100 micrometers ($\mu m$), greater than or equal to about 200 $\mu m$, greater than or equal to about 300 $\mu m$, greater than or equal to about 400 $\mu m$, greater than or equal to about 500 $\mu m$, greater than or equal to about 600 $\mu m$, greater than or equal to about 700 $\mu m$, greater than or equal to about 800 $\mu m$, greater than or equal to about 900 $\mu m$, or greater than or equal to about 1,000 $\mu m$, greater than or equal to about 1500 $\mu m$, or greater than or equal to about 2,000 $\mu m$. Each of the light conversion sections may have a light conversion section dimension of less than or equal to about 20 cm, less than or equal to about 10 cm, less than or equal to about 5 cm, less than or equal to about 3 cm, less than or equal to about 1 cm, less than or equal to about 500 mm, less than or equal to about 100 mm, less than or equal to about 50 mm, less than or equal to about 10 mm, less than or equal to about 5 mm, less than or equal to about 1 mm, less than or equal to about 9000 $\mu m$, less than or equal to about 8000 $\mu m$, less than or equal to about 7000 $\mu m$, less than or equal to about 600 $\mu m$, less than or equal to about 5000 $\mu m$, less than or equal to about 4000 $\mu m$, less than or equal to about 3000 $\mu m$, less than or equal to about 2000 $\mu m$, less than or equal to about 1000 $\mu m$, less than or equal to about 900 $\mu m$, less than or equal to about 800 $\mu m$, less than or equal to about 700 $\mu m$, less than or equal to about 600 $\mu m$, less than or equal to about 500 $\mu m$, less than or equal to about 400 $\mu m$, less than or equal to about 300 $\mu m$, or less than or equal to about 200 $\mu m$.

The light conversion sheet may have a thickness of greater than or equal to about 100 micrometers, greater than or equal to about 110 $\mu m$, greater than or equal to about 120 $\mu m$, greater than or equal to about 130 $\mu m$, or greater than or equal to about 140 $\mu m$. The light conversion sheet may have a thickness of less than or equal to about 1000 micrometers, less than or equal to about 900 $\mu m$, less than or equal to about 800 $\mu m$, less than or equal to about 700 $\mu m$, less than or equal to about 600 $\mu m$, less than or equal to about 500 $\mu m$, or less than or equal to about 450 $\mu m$.

In an embodiment, the light conversion sections may have an arrangement of a grid shape, a honeycomb shape, or any combinations thereof. The plurality of light-emitting sections may be matched to the light conversion section at one-to-one (1:1) (refer to FIGS. 5A and 5B). The plurality of light-emitting sections may correspond to (or be matched with) the light conversion section at n to 1 (e.g., one light-emitting section per n light conversion sections, where n is 2 or more, 3 or more, 4 or more, 9 or more, 16 or more, or 25 or more and 64 or less, 50 or less, 49 or less, 36 or less, 25 or less, 16 or less, or 9 or less). The plurality of light-emitting sections may be matched to the light conversion section in an n to 1 ratio.

In an embodiment, the light-emitting sections may be arranged in a honeycomb shape, and the light conversion sections may be arranged corresponding thereto, in 1 (the number of light-emitting sections): 1 (the number of light conversion sections) or n (the number of light-emitting sections): 1 (the number of light conversion sections). In an embodiment, the light-emitting sections may be arranged in a grid (or checkerboard shape), and the light conversion sections may be arranged corresponding thereto, in 1 (the number of light-emitting sections): 1 (the number of light conversion sections) or n (the number of light-emitting sections): 1 (the number of light conversion sections) (n is as defined above).

In an embodiment, the light conversion sheet may be produced by forming the first partition walls (e.g., on a substrate such as the aforementioned protective layer), and disposing a composition for producing a quantum dot polymer composite between the formed first partition walls to perform polymerization.

The composition for the quantum dot polymer composite may include the aforementioned polymerization component and quantum dots. The composition for the quantum dot polymer composite may further include metal oxide particulates. In an embodiment, the metal oxide particulate may include $TiO_2$, $SiO_2$, $BaTiO_3$, $Ba_2TiO_4$, ZnO, or any combinations thereof. The metal oxide particulate may have an appropriately selected diameter without a particular limit. The diameter of the metal oxide particulate may be greater than or equal to about 100 nm, for example, greater than or equal to about 150 nm or greater than or equal to about 200 nm and less than or equal to about 1000 nm, or less than or equal to about 800 nm, less than or equal to about 500 nm, less than or equal to about 400 nm, or less than or equal to about 300 nm.

In an embodiment, for the formation of the first partition wall, the method may include filling a release mold having an engraved pattern complementary to the partition wall, with a partition wall material, then bonding it to a substrate (e.g., a protective layer), and removing the release mold. Disposing of the composition for the quantum dot polymer composite between the formed partition walls may be performed by any method (e.g., spin coating) or a droplet discharging method, but is not limited thereto. The method may further include curing (and optionally drying or heat treating) the filled composition. In another embodiment, it may be produced by applying a composition for a quantum dot polymer composite on the appropriate substrate to form a film and stamping the partition wall material on the formed film.

The display device of an embodiment includes a backlight unit BLU including a plurality of light-emitting sections and a light conversion sheet and the light conversion sheet includes a plurality of light conversion sections having a predetermined arrangement and partition walls disposed between neighboring light conversion sections, so that light diffusion within the light conversion sheet (e.g., in the sheet plane direction) may be effectively controlled to match the local dimming area, and thus a significantly improved contrast ratio may be exhibited.

Figure 6:
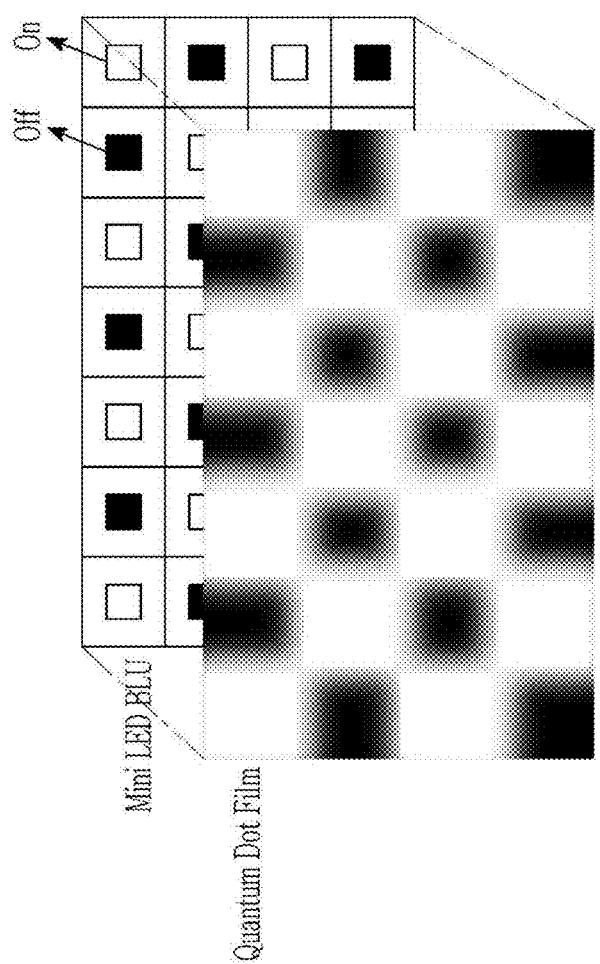
FIG. 6 is a view showing results of an operation in a local dimming method of an arrangement of a light conversion sheet and a backlight unit in a display device according to a comparative embodiment.
Figure 7:
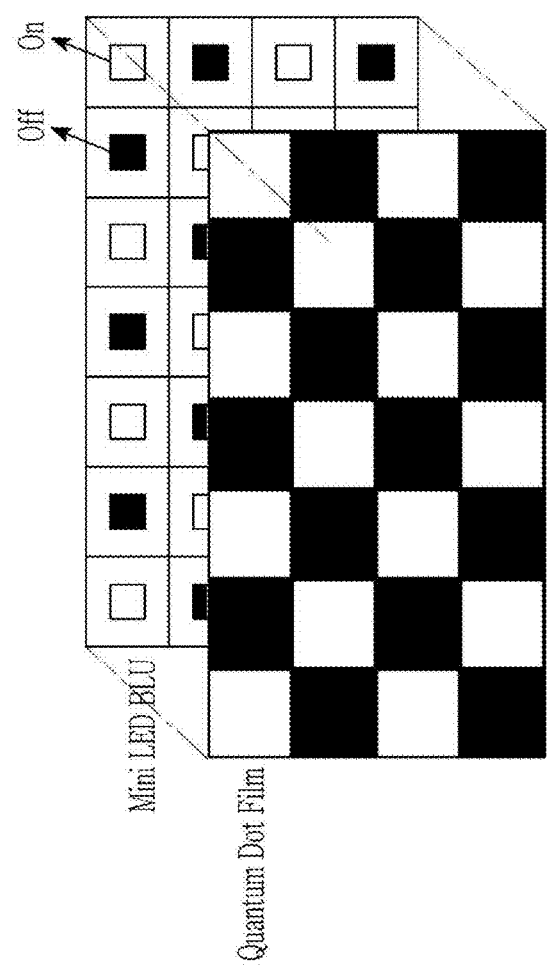
FIG. 7 is a diagram illustrating driving results of an embodiment of a local dimming method of a backlight unit and an arrangement of a light conversion sheet in a display device.

Referring to FIG. 6, when a light conversion sheet having no partition wall is combined with a BLU driven by a local dimming method, there is a limitation for the improvement of the contrast ratio. In the case of a display device in an embodiment, as shown in FIG. 7, the light conversion sheet including a plurality of light conversion sections defined by first partition walls is disposed on a backlight including a plurality of light-emitting sections (e.g., a plurality of mini LEDs), and thus light diffusion within the light conversion sheet is effectively limited to exhibit an improved contrast ratio.

While this disclosure has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A display device, comprising
a display panel, a backlight unit, and a light conversion sheet between the display panel and the backlight unit,
wherein the backlight unit comprises a plurality of light-emitting sections facing the light conversion sheet, a light source is disposed in a light emitting section of the plurality of light-emitting sections,
the light conversion sheet comprises a plurality of first partition walls and a plurality of light conversion sections arranged to correspond to the plurality of light-emitting sections, a first partition wall of the plurality of first partition walls is disposed between adjacent light conversion sections of the plurality of light conversion sections,
a light conversion section of the plurality of light conversion sections comprises first quantum dots emitting a first light and second quantum dots emitting a second light having a color different from a color of the first light, and the first quantum dots and the second quantum dots are mixed in the light conversion section,
the light source is configured to provide a light of a predetermined wavelength to the light conversion sheet,
wherein the backlight unit further comprises a second partition wall disposed between the plurality of light-emitting sections,
wherein the light conversion section is configured to emit a mixed light of the first light, the second light, and the light of the predetermined wavelength,
wherein the first partition wall comprises a light blocking material that is configured to block at least a portion of the mixed light,
wherein the display panel comprises a display area comprising a plurality of pixels, and
wherein the plurality of pixels comprises a red pixel, a green pixel, and a blue pixel, and the display panel comprises a color filter layer comprising a red color filter, a green color filter, and a blue color filter corresponding to the red pixel, the green pixel, and the blue pixel, respectively.

2. The display device of claim 1, wherein the first partition wall is not disposed over the plurality of light-emitting sections, and
the first partition wall is disposed to be overlapped with at least a portion of the second partition wall.

3. The display device of claim 1, wherein the first partition wall is not disposed over the plurality of light-emitting sections.

4. The display device of claim 1, wherein the light conversion section of the plurality of light conversion sections has a length of a shortest straight line which crosses a center of a corresponding light conversion section in a range greater than or equal to about 100 micrometers and less than or equal to about 20 centimeters among the plurality of light conversion sections.

5. The display device of claim 1, wherein the plurality of light conversion sections is arranged in a form of a grid, a honeycomb, or a combination thereof.

6. The display device of claim 1, wherein the light conversion sheet has a thickness of greater than or equal to about 100 micrometers.

7. The display device of claim 1, further comprising a protective layer which is disposed on at least one of opposite surfaces of the light conversion sheet.

8. The display device of claim 1, wherein the first partition wall comprises a side wall extending in a thickness direction of the light conversion sheet within the light conversion sheet.

9. The display device of claim 1, wherein the first partition wall comprises a pigment that is configured to block the light of the predetermined wavelength.

10. The display device of claim 1, wherein the first partition wall absorbs at least a portion of the mixed light.

11. The display device of claim 1, wherein the first partition wall reflects at least a portion of the mixed light.

12. The display device of claim 1, wherein the first partition wall comprises a white pigment, a black pigment, or a combination thereof.

13. The display device of claim 1, wherein each of the plurality of light-emitting sections is independently driven; or
wherein the plurality of light-emitting sections match with the plurality of light conversion sections at 1:1 or to match with the plurality of light conversion sections at n:1 wherein n is an integer of 2 or more and 50 or less.

14. The display device of claim 1, wherein the plurality of light-emitting sections comprises a first section and the first section comprises a first light source or sub-partition walls surrounding the first light source.

15. A display device, comprising
a display panel, a backlight unit, and a light conversion sheet between the display panel and the backlight unit,
the backlight unit comprises a plurality of light-emitting sections, a light source is disposed in a light emitting section of the plurality of light-emitting sections,
the light conversion sheet comprises a plurality of first partition walls and a plurality of light conversion sections arranged to correspond to the plurality of light-emitting sections, a first partition wall of the plurality of first partition walls is disposed between adjacent light conversion sections of the plurality of light conversion sections,
a light conversion section of the plurality of light conversion sections comprises a first quantum dot emitting a first light and a second quantum dot emitting a second light having a color different from a color of the first light, and the light source is configured to provide light of a predetermined wavelength to the light conversion sheet, and wherein the display panel comprises a display area comprising a plurality of sub-pixels and a non-display area disposed between the plurality of sub-pixels, and wherein a second partition wall disposed to define the plurality of light-emitting sections and the first partition wall are disposed to correspond to the non-display area of the display device.

16. A display device, comprising
a display panel, a backlight unit, and a light conversion sheet between the display panel and the backlight unit,
wherein the backlight unit comprises a plurality of light-emitting sections, at least one light source is disposed in each of the plurality of light-emitting sections,
the light conversion sheet comprises a plurality of first partition walls and a plurality of light conversion sections arranged to correspond to the plurality of light-emitting sections, a first partition wall of the plurality of first partition walls is disposed between adjacent light conversion sections of the plurality of light conversion sections,
a light conversion section of the plurality of light conversion sections comprises a first quantum dot emitting a first light and a second quantum dot emitting a second light having a color different from a color of the first light, and the first quantum dot and the second quantum dot are mixed in the light conversion section, wherein the display panel comprises a display area comprising a plurality of sub-pixels and a non-display area disposed between the plurality of sub-pixels, and wherein the plurality of sub-pixels comprises a red pixel, a green pixel, and a blue pixel, and the display panel comprises a color filter layer comprising a red color filter, a green color filter, and a blue color filter corresponding to the red pixel, the green pixel, and the blue pixel, respectively.

17. The display device of claim 16, wherein the display panel further comprises a liquid crystal layer between the color filter layer and the light conversion sheet.

18. The display device of claim 1, wherein the light of the predetermined wavelength is light of a blue wavelength spectrum, the first light comprises green light, and the second light comprises red light.

19. The display device of claim 1, wherein in the light conversion sheet, each of the plurality of light conversion sections is a display device configured to emit white light.

20. The display device of claim 19, wherein the white light is a mixed light of lights of a red wavelength spectrum, a green wavelength spectrum, and a blue wavelength spectrum.

* * * * *